United States Patent [19]

Lee

[11] Patent Number: 5,659,485
[45] Date of Patent: Aug. 19, 1997

[54] DISCHARGE FLOW CONTROL SYSTEM AND METHOD IN HYDRAULIC PUMP

[75] Inventor: Jin-Han Lee, Kyungkee, Rep. of Korea

[73] Assignee: Samsung Heavy Industry Co., Ltd., Rep. of Korea

[21] Appl. No.: 233,517

[22] Filed: Apr. 26, 1994

[30]       Foreign Application Priority Data

Jul. 2, 1993 [KR]   Rep. of Korea ................. 93-12454

[51] Int. Cl.$^6$ ........................................ F16D 31/02
[52] U.S. Cl. ........................ 364/510; 60/487; 60/489; 60/490; 60/491; 60/492
[58] Field of Search ..................... 60/423, 329, 431, 60/428, 488, 487; 244/78; 91/446; 364/510, 424.07

[56]              References Cited

U.S. PATENT DOCUMENTS

| | | | |
|---|---|---|---|
| 4,967,557 | 11/1990 | Izumi et al. | 60/423 |
| 5,155,996 | 10/1992 | Tatsumi et al. | 60/431 |
| 5,174,114 | 12/1992 | Aoyagi | 91/446 |
| 5,251,440 | 10/1993 | Bong-dong et al. | 60/329 |
| 5,351,914 | 10/1994 | Nagao et al. | 244/79 |

*Primary Examiner*—Emanuel T. Voeltz
*Assistant Examiner*—Demetra R. Smith
*Attorney, Agent, or Firm*—Lieberman & Nowak, LLP

[57]              ABSTRACT

A discharge flow control system and method of a hydraulic pump driven by an engine for the minimization of the difference between a discharge mount of flow in the pump and total mount of operating oil necessary to operate each actuator in hydraulic equipment. The control system is provided with a detector which detects the number of rotation of the engine, generates equal number of pulses to the number of rotation, a detector which detects the tilt angle of a swash plate of the pump, a detector which detects the operating displacement of the actuator, a detector which detects the load pressure acting on the pump, and a controll unit which controls a target discharge flow mount of the pump which is suitable for performing a predetermined work based on the number of rotation, the tilt angle, the displacement and the load pressure.

3 Claims, 6 Drawing Sheets

DISCHARGE FLOW CONTROL SYSTEM AND METHOD IN HYDRAULIC PUMP

BACKGROUND OF THE INVENTION

1. Field of the Invention

The present invention relates to a discharge flow control system and method of a hydraulic pump in hydraulic equipment such as excavator, loader, dozer, crane, etc., and more particularly to a discharge flow control system and method to make the hydraulic pump to discharge a fairly precise mount of flow required for a desired work

2. Decription of Prior Arts

In recent years, with the developement of electronic control unit such as microprocessors, the hydraulic system, particularly in heavy construction equipment, incorporates the electronic devices for automation.

The fundamental technologies required in the automation of construction equipment such as excavator include a position control technology for various moving parts, and an energy minimization technology for preventing flow loss.

The most general way which has been used for the enhancement of the operation efficiency of equipment and for the precise position control is to compare the flow amount required by an operator with the tilt angle data of the swash plate in hydraulic pump by a tilt angle detecting means, and compensate for errors therebetween.

FIG. 1 shows a schematic diagram of hydraulic system in a conventional excavator.

As shown in FIG. 1, the hydraulic system has an engine 1 which serves as a power source, two variable displacement pumps 2 and 3 and an auxilliary pump 4 for discharging a constant amount of operating oil, two pump regulators 5 and 6 for controlling each pump by moving each swash plate in pumps 2 and 3, solenoid controlled proportional valves 7 and 8 for pumps 2. and 3 to generate a pilot pressure proportional to an input signal by the operating oil supplied from auxilliary pump 4 and to provide the pilot pressure to pump regulators 5 and 6, at least one or more hydraulic actuators 9, 10 and 11 which are driven by a discharge flow of pumps 2 and 3, a flow control valve 12 to control the direction and the amount of flow between actuators 9, 10 and 11 and pumps 2 and 3 by the displacement of a spool therein, and a solenoid controlled proportional valve 13 generating a pilot pressure for flow control valve 12.

However, the conventional system described above has the drawbacks that a frequent operation error occurs due to hysterisis characteristics of the solenoid controlled proportional valves, and that a precise control of the discharge flow amount is difficult due to the variable efficiency of the pumps.

SUMMARY OF THE INVENTION

It is an object of the present invention to provide a discharge flow control system in a hydraulic pump in which precise control of discharge flow mount required for a desired work can be possible and operation errors can be greatly reduced.

It is another object of the present invention to provide a discharge flow control method of in a hydraulic pump in which precise control of discharge flow mount required for a desired work can be possible and operation errors can be greatly reduced.

According to one aspect of the present invention, there is provided a system for controlling a discharge flow mount of a hydraulic pump in a hydraulic system having an engine to drive the pump and at least one hydraulic actuator operated by oil flow from the pump, comprising: means for detecting the number of rotation of the engine, and generating equal number of pulses to the number of rotation; means for detecting the tilt angle of a swash plate of the pump; means for detecting the operating displacement of the actuator; means for detecting the load pressure acting on the pump; and means for controlling a target discharge flow mount of the pump which is suitable for performing a predetermined work based on the number of rotation, the tilt angle, the displacement and the load pressure.

According to another aspect of the present invention, there is provided a method for controlling a discharge flow mount of a hydraulic pump in a hydraulic system having an engine to drive the pump and at least one hydraulic actuator operated by oil flow from the pump, comprising steps of: calculating a required flow amount of the actuators needed to perform a predetermined operation; calculating a dischargeable flow amount of the pump based on a load pressure acting thereto; calculating a required discharge flow mount of the pump needed to perform the predetermined operation; reading the number of rotation of the engine, the tilt angle of a swash plate of the pump, and the operating displacement of the actuator; calculating an actual discharge flow mount of the pump based on the number of rotation, the tilt angle and the operating displacement; calculating an actual flow mount provided from the pump to the actuator; calculating a difference between the required and the actual actual discharge flow amounts of the pump, and another difference between the required and the actual flow mounts of the actuator; calculating a target discharge flow amount of the pump which is suitable for performing the predetermined operating based on the relation of the two differences; and converting the target discharge flow mount into a voltage signal for use as a control signal in the hydraulic system.

BRIEF DESCRIPTION OF THE DRAWINGS

These and other features of the present invention will now be described in detail with reference to the accompanying drawings, in which.

DETAILED DESCRIPTION OF THE PREFERRED EMBODIMENT

Figure 1:
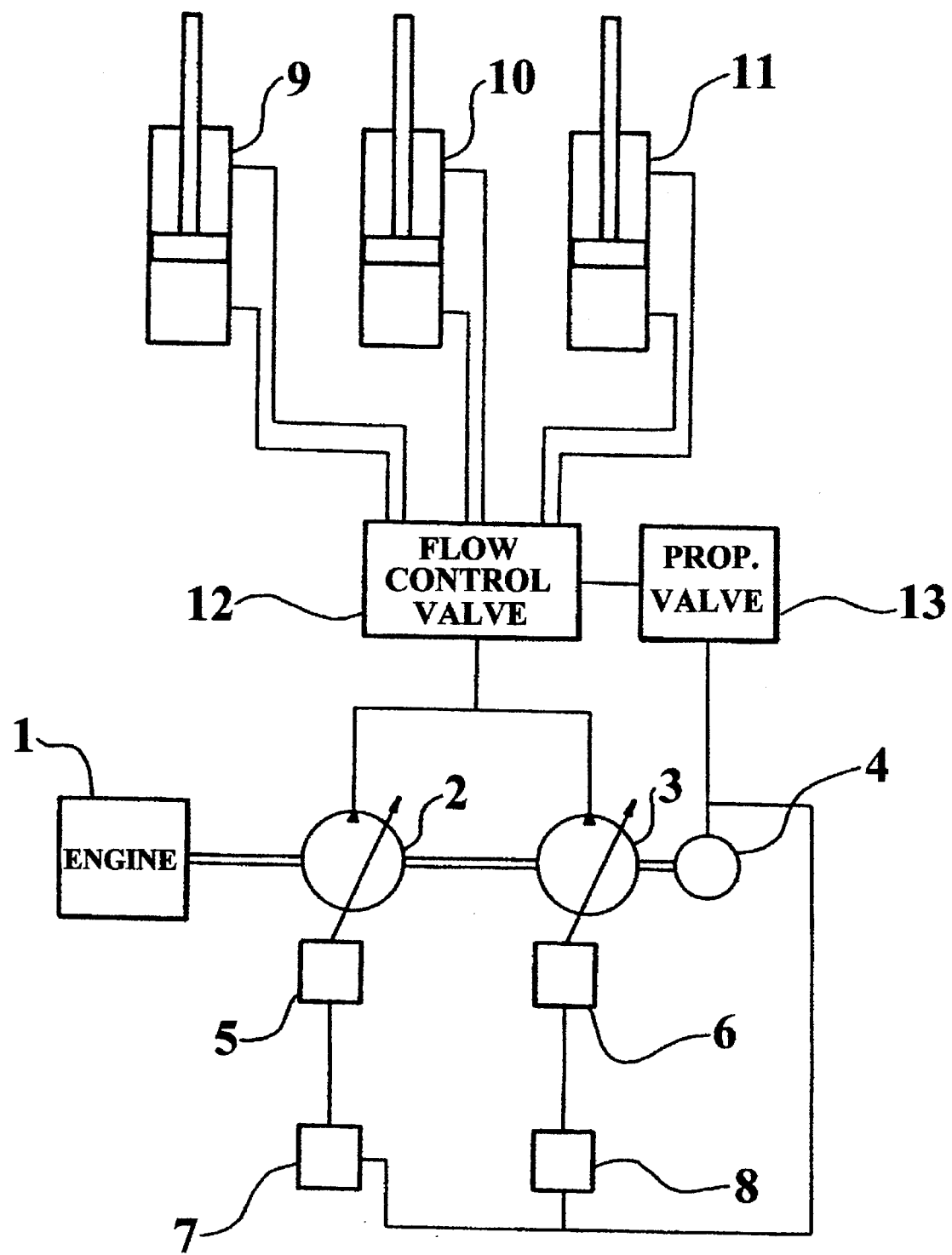
FIG. 1 shows a schematic diagram of hydraulic system in a conventional excavator.
Figure 2:
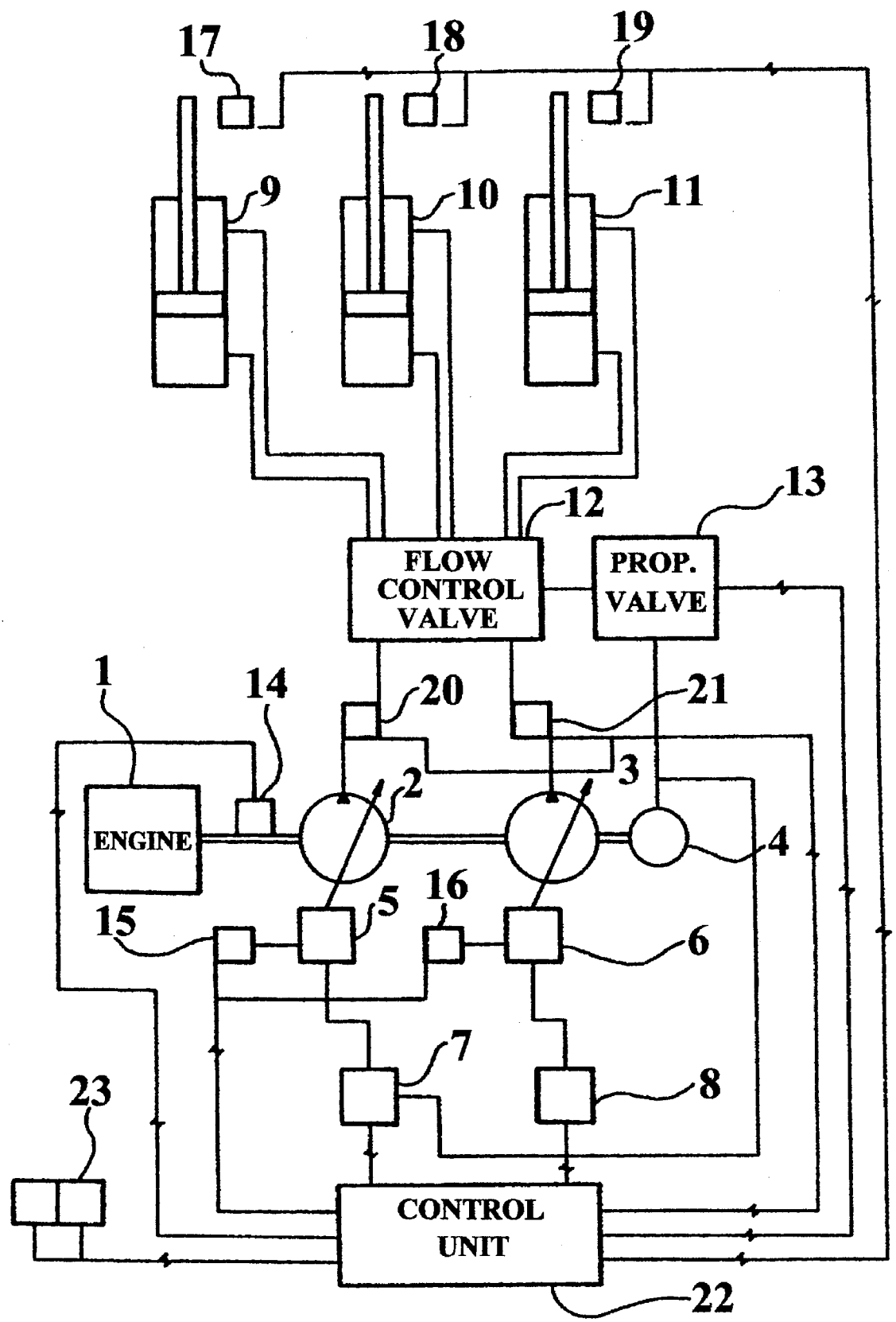
FIG. 2 shows a schematic diagram of hydraulic system in an excavator according to the present invention.

FIG. 2 shows a schematic diagram of a hydraulic system in an excavator according to the present invention.

As shown in FIG. 2, a discharge flow control system in the excavator according to the present invention includes a rotation detector 14 detecting the rotation number of an engine 1, tilt angle detector 15 and 16 of the swash plate in hydraulic pumps 2 and 3 operated by the regulators 5 and 6, operating displacement detectors 17, 18 and 19 for the hydraulic actuators 9, 10 and 11, load pressure detectors 20 and 21, an electronic control unit 22 and an operator 23.

During the engine operation, when operation signals by an operator are provided to a central processing unit (CPU) in an electronic control unit 22 as input requirement data, or when the input requirement data are provided to the CPU in other way, for example, in order to perform an excavating work automatically and repeatedly, the input requirement data stored in a memory of electronic control unit 22 are provided to the CPU, the CPU calculates a required flow mount of each actuator related to each knuckle(i.e., boom cylinder, dipper stick cylinder, bucket cylinder, etc. of the excavator) based on the input requirement data. By this calculation, a dischargeable flow amount of pumps 2 and 3 is calculated.

When the calculation of the dischargeable flow amount of pumps 2 and 3 has been completed, electronic control unit 22 sends a control signal(i.e., an electric signal) corresponding to the calculated value to solenoid controlled proportional valves 7 and 8, respectively, allowing a flow amount equal to the above calculated value to be discharged from pumps 2 and 3.

As a result, the tilt angle of the swash plate can be controlled by regulators 5 and 6 which are actuated by the pilot pressure provided from valves 7 and 8, so that the operating oil of which the amount is corresponding to the operation value calculated by electronic control unit 22 can be discharged.

At this time, tilt angle detectors 15 and 16 detect the actual moving angle of the swash plate moved by the control of electronic control unit 22. At the same time, electronic control unit 22 reads the number of rotations of engine 1 from rotation detector 14 and calculates the actual discharge flow amount of pumps 2 and 3.

In addition, electronic control unit 22 reads the actual operating displacement of hydraulic actuators 9, 10 and 11 and converts it to flow amount. Thus, electronic control unit 22 calculates the actual discharge flow amount of pumps 2 and 3 and the actual operating flow amount required to operate actuators 9, 10 and 11 with the difference between these flow amounts, and generates control signals which have been compensated for the difference.

On the other hand, the electronic control unit 22 converts the value of the flow mount of the actuators corresponding to the operating signals into output electric signals(i.e. valve control signals), which are then provided to solenoid controlled proportional valve 13. Thus, the spool of flow control valve 12 can be moved by the pilot pressure provided from solenoid controlled proportional valve 13, allowing the flow amount discharged from pumps 2 and 3 to be fed to actuators 9, 10 and 11.

Figure 3:
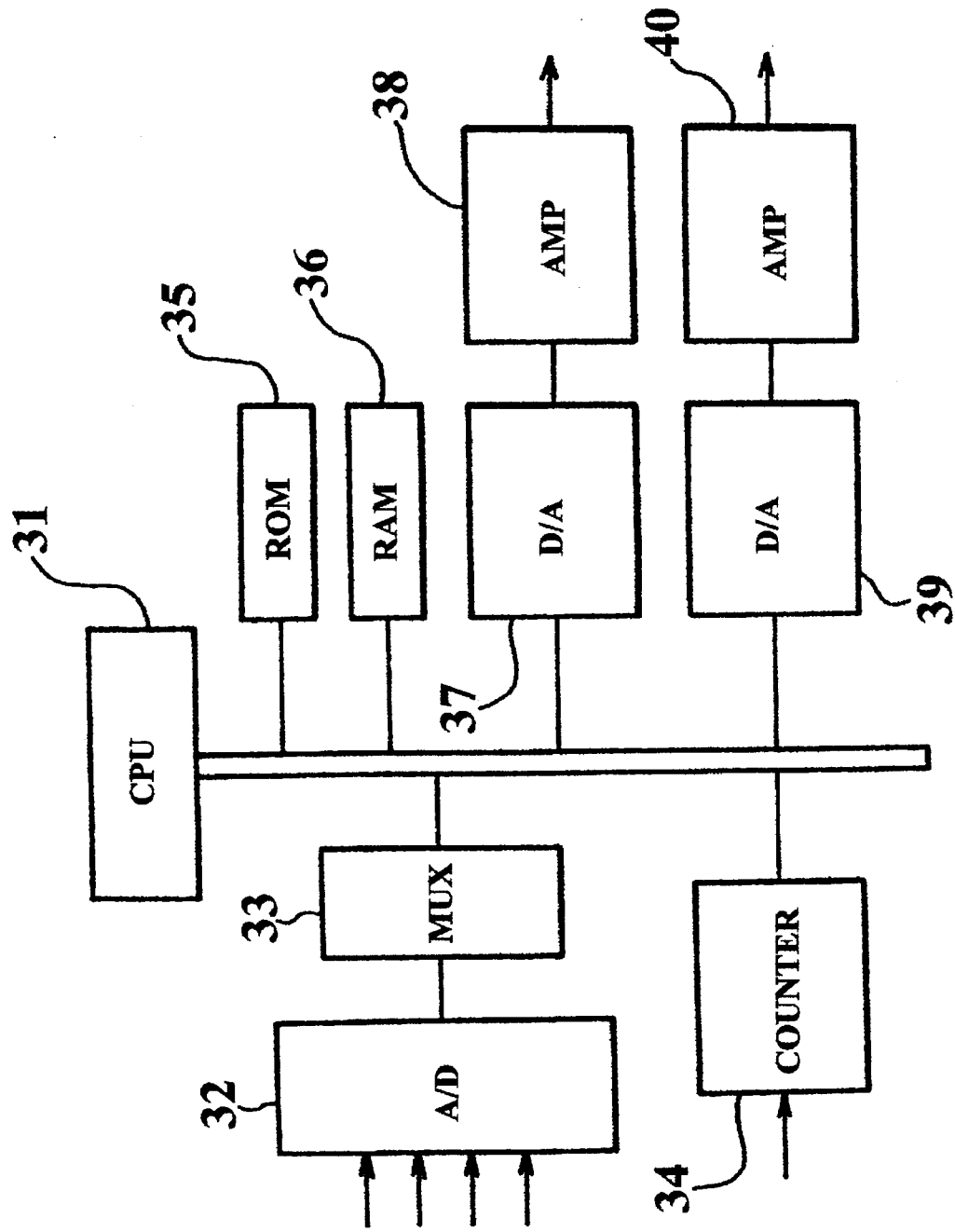
FIG. 3 shows a detailed circuit diagram of electronic control unit shown in FIG. 2.
Figure 4:
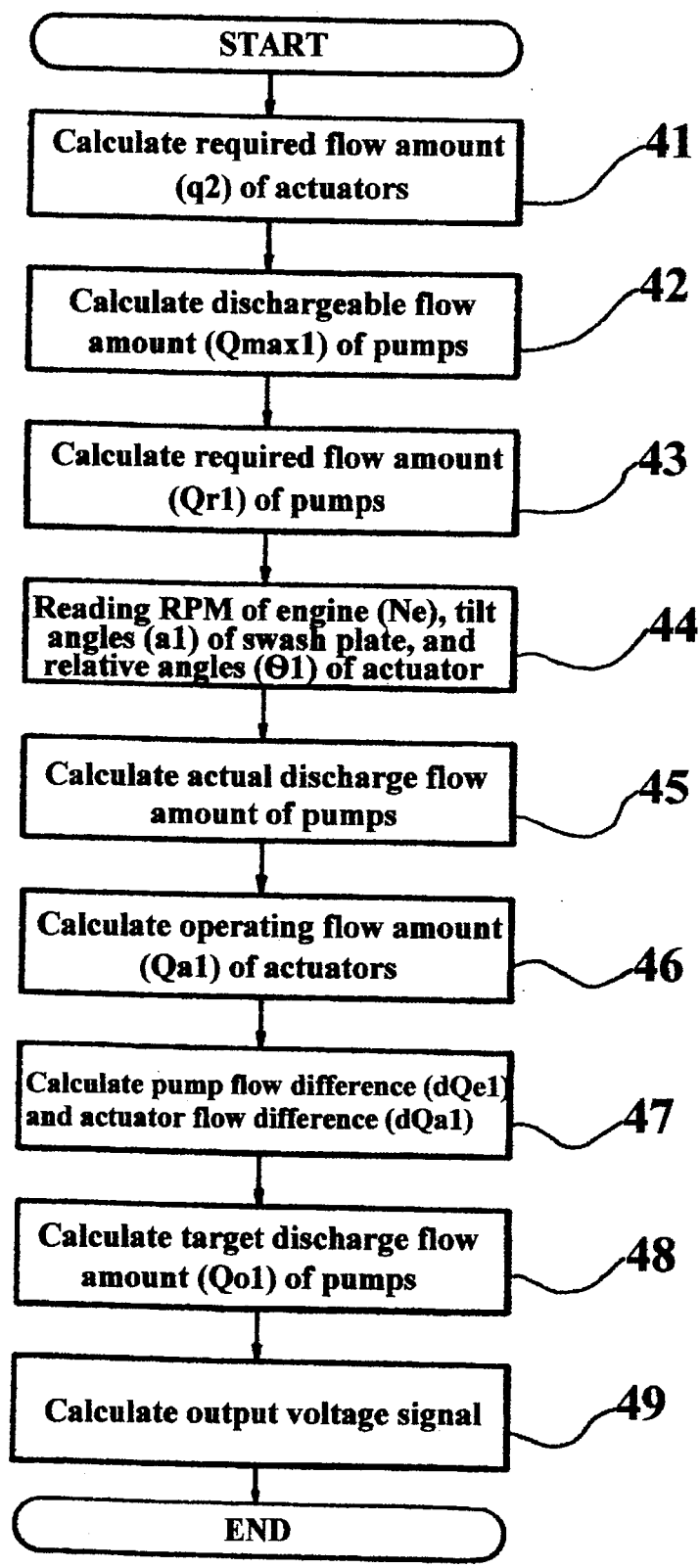
FIG. 4 shows a flow chart explaining the control process performed in the electronic control unit shown in FIG. 3.

FIG. 3 shows a detailed construction view of electronic control unit 22 for embodying the object of the present invention, and FIG. 4 shows a flow chart for performing the control process of electronic control unit 22.

Referring to FIG. 3, electronic control unit 22 includes a central processing unit(CPU) 31 consisted of a microprocessor; an analog to digital converter(A/D converter) 32 for converting the analog signals provided from detectors 15 to 21 and operator 23 into digital signals; a multiplexer 33 for selecting one of output data signals of A/D converter 32; a counter 34 for counting the output pulses of generated by rotation detector 14 of which the number of the output pulses are equal to the number of rotations of engine 1; a read only memory(ROM) 35 in which a control program to be performed by CPU 31 is stored; a random access memory (RAM) 36; digital to analog converters (D/A converter) 37 and 39 for converting the digital signals into analog signals to control the operation of solenoid controlled proportional valves 7, 8 and 13; and amplifiers 38 and 40 for amplifying the output signals of D/A converters 37 and 39 and for providing these output signals to solenoid controlled proportional valves 7, 8 and 13, respectively.

When the equipment is operated, CPU 31 performs its control function based on the program stored in ROM 35. At this time, CPU 31 controls A/D converter 32, so that the analog electric signals fed from tilt angle detectors 15 and 16 and operating displacement detectors 17, 18 and 19 are converted into digital signals. And then, the digital signals are stored in RAM 36.

In addition, CPU 31 controls counter 34, counts the number of pulses provided from rotation detector 14, and stores the number of the counted pulses in RAM 36.

As has been explained, electronic control unit 22 produces the control signals to control solenoid controlled proportional valves 7, 8 and 13. For this function, CPU 31 calculates output data using the data stored in RAM 36 and provides the output data to D/A converters 37 and 39 as predetermined digital signals, respectively.

The digital signals provided to the D/A converters 37 and 39 are converted into analog signals. These analog signals are fed to amplifiers 38 and 40 and provided to solenoid controlled proportional valves 7, 8 and 13, respectively.

The process of the above will be more apparent in the following description, with reference to FIG. 4.

First, each required amounts of flow q1, q2, q3 of actuators 9, 10 and 11 for moving each knuckle member at a predetermined angle required for performing a work are calculated in step 41.

When the equipment is manually operated, the output of operating means 23 is received through A/D converter 32 and multiplexer 33, and then required amounts of flow q1, q2, q3 of actuators 9, 10, 11 are calculated.

When an automatic repeating operation is performed, the operating speed of each knuckle necessary to reach at a target position is calculated and converted into each required amounts of flow q1, q2, q3 of actuators 9, 10 and 11.

When the calculation or the conversion of the required amounts of flow q1, a2, q3 have been completed, load pressures P1 and P2 acting on pumps 2 and 3 are detected respectively through pressure detectors 20 and 21 of which the output voltages are increased proportionally to the pressure.

Figure 6:
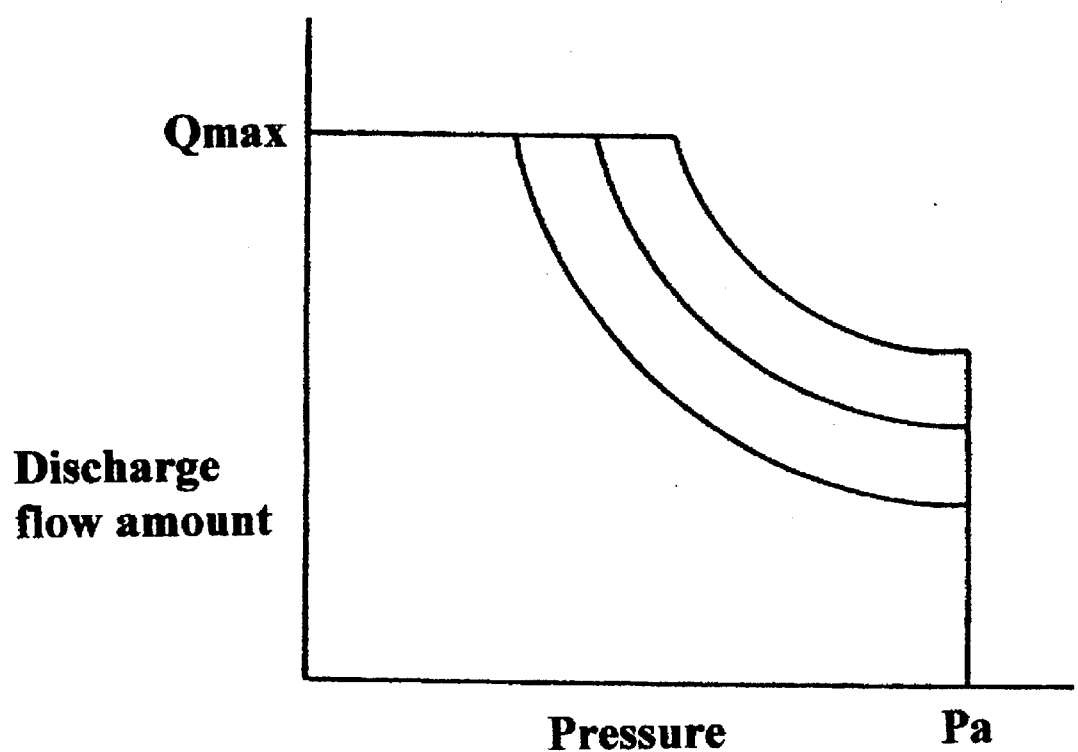
FIG. 6 shows the output characteristics of pump.

And then, in step 42, the dischargeable amounts of flow Qmax1 and Qmax2 of pumps 2 and 3 corresponding to the load pressures are calculated from the output characteristics graphs(i.e., graphs 1, 2 and 3) which are determined by the output power of engine 1, as shown in FIG. 6.(step 42)

It has been already determined that which pump among pumps 2 and 3 is matched with which actuator among actuators 9, 10 and 11. Upon this determination, required flow amounts Qr1 and Qr2 of each of pumps 2 and 3 are calculated in step 43.

At this time, required flow amounts Qr1 and Qr2 of pumps 2 and 3 are determined depending on:

(i) which actuator among actuators 9, 10 and 11 is operated; and (ii) the internal structure of flow control valve 12 which controls the dischargeable flow amounts of pumps 2 and 3 as well as the operating oil flowing from pumps 2 and 3 to actuators 9, 10 and 11. Data for the above process are recorded in the flow distribution table.

For example, according to the flow distribution table, if the flow amount is required to all actuators 9, 10 and 11, the required flow amounts Qibk and Qibm of bucket cylinder 9 and boom cylinder 11 are supplied from the first pump 2, and the required amount of flow Qids of dipper stick cylinder 10 is supplied from the second pump 3.

In addition, tilt angles $\alpha 1$ and $\alpha 2$ of the swash plate in pumps 2 and 3 detected by tilt angle detectors 15 and 16 are read out by A/D converter 32, and the number of pulses corresponding to the number of rotations per hour of engine 1 provided from rotation detector 14 incorporating a magnetic pick-up sensor, are counted by counter 34.

At the same moment, the relative angles $\beta 1$, $\beta 2$ and $\beta 3$ between the knuckles are detected by operating displacement detectors 17, 18 and 19 incorporating a potentiometer, etc., in which the output voltage varies with the angles. And then, the output voltages corresponding to angles $\beta 1$, $\beta 2$ and $\beta 3$ are read out by A/D converter 32(step 44).

After reading the number of rotations Ne of engine 1, tilt angles $\alpha 1$ and $\alpha 2$ of the swash plate and knuckle angles $\beta 1$, $\beta 2$ and $\beta 3$, discharge volumes De1 and De2 of pumps 2 and 3 are calculated from tilt angles $\alpha 1$ and $\alpha 2$ of the swash plate, and then actual discharge flow amounts Qe1 and Qe2 are calculated by multiplying of Ne by De1 and De2, respectively(step 45).

Figure 5:
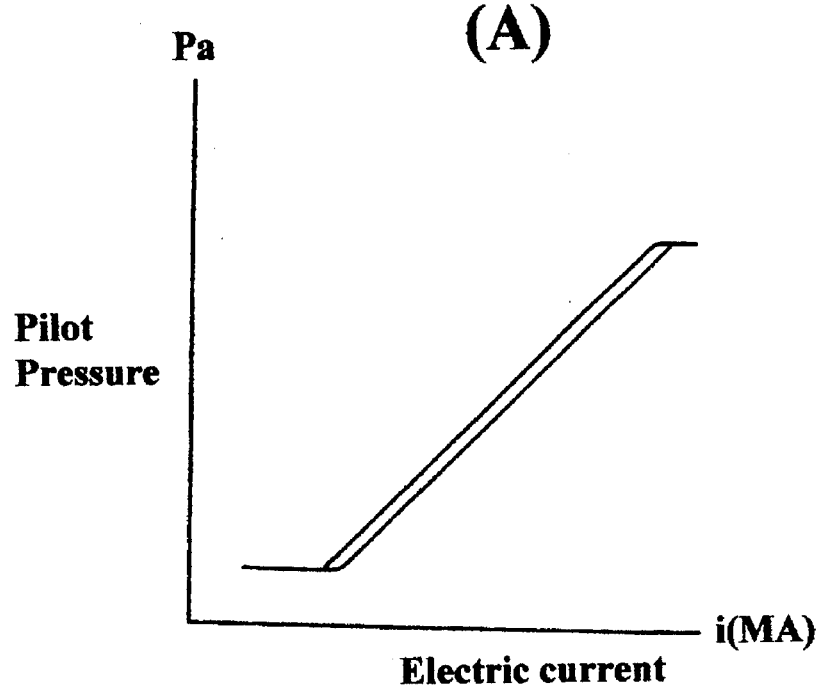
FIG. 5a and FIG. 5b show input/output characteristics of solenoid controlled proportional valve and hydraulic pump according to the present invention, respectively.
Figure 5:
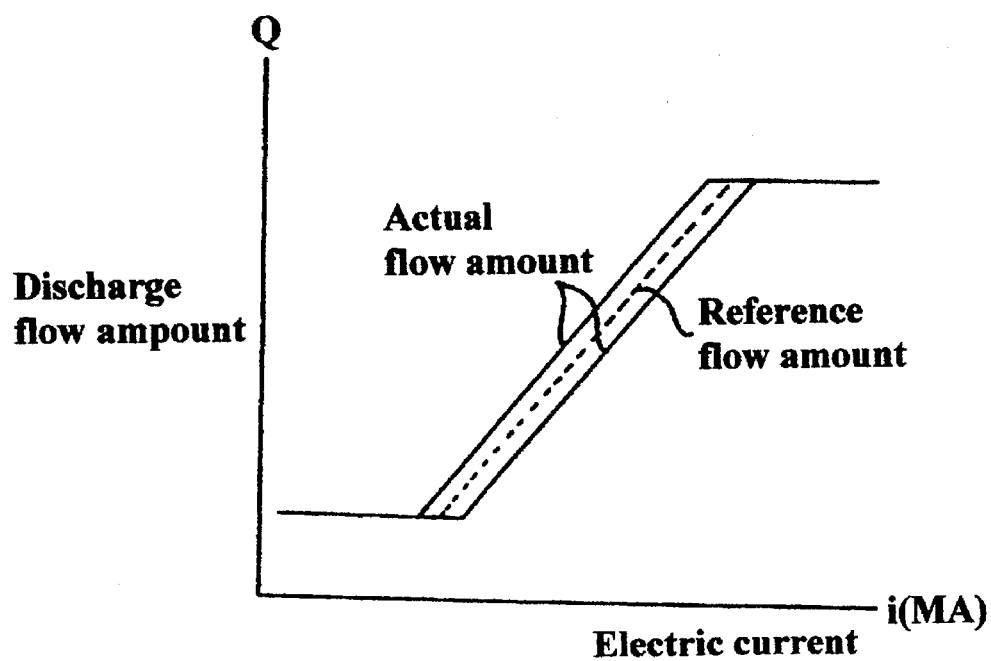

FIG. 5a and FIG. 5b show a relationship among electrical currents i1 and i2 supplied to solenoid controlled proportional valves 7 and 8, the pilot pressure applied to pumps 2 and 3 from valves 7 and 8, and the actual discharge flow amount of pumps 2 and 3.

As is shown in these figures, there is a substantial difference in flow amounts, due to the characteristics such as a hysterisis phenomenon in the solenoid controlled proportional valves and a responding speed of the system.

Therefore, actual discharge flow amounts Qe1 and Qe2 can be calculated more accurately by taking the difference into account.

After the actual discharge flow amounts Qe1 and Qe2 of pumps 2 and 3 have been calculated, the operating flow amounts Qa1 and Qa2 acting on actuators 9, 10 and 11 are calculated in step 46.

The process for calculating of operating flow amounts Qa1 and Qa2 of pumps 2 and 3 will be described more in detail in the following.

Moving elements such as boom, bucket and dipper stick are coupled to one another by actuators 9, 10 and 11 with a plurality of links. Accordingly, by reading periodically relative angles $\beta 1$, $\beta 2$ and $\beta 3$ among the moving elements which are connected to actuators 9, 10 and 11, respectively, angular velocities $\beta' 1$, $\beta' 2$ and $\beta' 3$ of moving elements are calculated. Depending on these data, operating displacement(or, in case of the hydraulic cylinder, a stroke of the cylinder) can be obtained.

The actual operating flow amounts Qa1 and Qa2 of pumps 2 and 3 acting on actuators 9, 10 and 11 can be calculated by muliplying the volumes of actuators 9, 10 and 11 by linear velocities $\alpha'1$, $\alpha'2$ and $\alpha'3$ of actuators 9, 10 and 11.

In case that actuators 9, 10 and 11 are hydraulic cylinders, the method for detecting directly the strokes of the cylinders without detecting the relative velocities of the moving elements may be applied.

On the other hand, if the actuators are hydraulic motors, angular velocities $\beta'1$, $\beta'2$ and $\beta'3$ can be used for this purpose.

Next, depending on the flow amount table described in step 45, flow amounts Qa1 and Qa2(hereinafter, referred to as "knuckle operating flow amount") acting actually on actuators 9, 10 and 11 are calculated.

For example, if each of pumps 2 or 3 is used independently, the knuckle operating flow amounts Qa1 and Qa2 as the boom cylinder, the dipper stick cylinder or the bucket cylinder operated are as follows:

$$Qa1=qa1+qa3$$

$$Qa2=qa2,$$

wherein, qa1 is the flow amount in the bucket cylinder, qa2 is the flow amount in the dipper stick cylinder, and qa3 is the flow amount in the boom cylinder.

When the flow amounts of each of pumps 2 and 3 discharge together, i.e., when the boom cylinder and the bucket cylinder are operated in a combined way, the operating flow amounts Qa1 and Qa2 of the actuators are as follows:

a) If the sum of the operating flow mounts is smaller than the discharge flow mount in the first pump 2

$$Qa1=qa1+qa3$$

$$qa2=0$$

b) If the sum of the operating flow amounts is larger than the discharge flow amount in the first pump 2, $$qa1=Qmax1$$

$$Qa2=qa1+qa3-qmax1$$

In step 47, the difference of flow amounts between required flow amounts Qr1 and Qr2 of pumps 2 and 3 calculated in step 43 and actual discharge flow amounts Qe1 and Qe2(hereinafter, referred to as "pump flow difference") is calculated, and at the same time, the flow difference between required flow amounts Qr1 and Qr2 of pumps 2 and 3 and discharge flow amounts Qa1 and Qa2 of pumps 2 and 3 provided to the actuators(hereinafter, referred to as "actuator flow difference") are calculated as follows:

$$dQe1=Qr1-Qe1, dQe2=Qr2-Qe1$$

$$dQa1=Qr1-Qa1, dQa2=Qr2-Qa2$$

In step 48, a target discharge flow mounts Qo1 and Qo2 of pumps 2 and 3 are determined based on the relative value of the pump flow differences dQe1 and dQe2 and the actuator flow differences dQa1 and dQa2 as follows:

$$Qo=(Ppe+Pia) \times dQe+(Ppa+Pia) \times dQa=dQoe+dQoa+Qo-1$$

wherein,

Ppe, Ppa=proportional gain,

Pie, Pia=integral gain, dQoe, dQoa=corrected flow mounts of pumps 2 and 3 and actuators 9, 10 and 11 during a control cycle, respectively, Qo-1=a target discharge flow mount of pumps 2 and 3 in the previous cycle.

Although the proportional integral gain is used as the control gain in this embodiment, the combination of the proportional gain, the differential gain and the integral gain can be used as the control gain.

The output flow mount compensated by the calculation as a final target discharge flow mount is converted to the output voltage and sent through D/A converter 39 of electronic control unit 22 to amplifier 40.

And then amplifier 40 converts the output voltage to current signal, amplifies it, and drives solenoid controlled proportional valves 7 and 8.

Thus, the pilot pressure transmitted to pump regulators 5 and 6 from auxilliary pump 4 responds to the current signal provided from amplifier 40, controlling the tat angle of the swash plate in pumps 2 and 3.

In this way, the discharge amount of pumps 2 and 3 are compensated and the target discharge flow amount are fed to each of actuators 9, 10 and 11(step 49).

According to the present invention as described in the above, it is apparent that the pump discharges precise amount of flow required for an operation of the actuator, with remarkably reduced errors in an automatic operation.

What is claimed is:

1. A system for controlling a discharge flow mount of a hydraulic pump in a hydraulic system having an engine to drive the pump and at least one hydraulic actuator operated by oil flow from the pump, comprising:

means for detecting the number of rotations of the engine, and generating equal number of pulses to the number of rotations;

means for detecting the tilt angle of a swash plate of the pump;

means for detecting directly the operating displacement of the actuator;

means for detecting the load pressure acting on the pump; and means for controlling a target discharge flow mount of the pump which is suitable for performing a predetermined work based on the number of rotations, the tilt angle, the displacement and the bad pressure.

2. The system according to claim 1, wherein the control means comprises:

a central processing unit;

at least one means for converting analog signals from the tilt angle detecting means, the operating displacement detecting means, and the load pressure detecting means into digital signals;

a means for selecting one of the output digital signals from the A/D converter;

a means for counting the number of the output pulses of the rotation detecting means;

a means for storing a control program to be performed by the central processing unit;

at least one means for converting the output digital signals into analog signals; and at least one means for amplifying the output analog signals and for providing the amplified analog signals as control signals for the pump.

3. A method for controlling a discharge flow mount of a hydraulic pump in a hydraulic system having an engine to drive the pump and at least one hydraulic actuator operated by oil flow from the pump, comprising steps of:

calculating a required flow mount of the actuators needed to perform a predetermined operation;

calculating a dischargeable flow mount of the pump based on a load pressure acting thereto;

calculating a required discharge flow mount of the pump needed to perform the predetermined operation;

reading the number of rotations of the engine, the tilt angle of a swash plate of the pump, and the operating displacement of the actuator;

calculating an actual discharge flow mount of the pump based on the number of rotations, the tilt angle and the operating displacement;

calculating an actual flow mount provided from the pump to the actuator;

calculating a difference between the required and the actual actual discharge flow mounts of the pump, and another difference between the required and the actual flow mounts of the actuator;

calculating a target discharge flow amount of the pump which is suitable for performing the predetermined operating based on the relation of the two differences; and converting the target discharge flow mount into a voltage signal for use as a control signal in the hydraulic system.

* * * * *